(12) United States Patent
Sawdayee et al.

(10) Patent No.: US 11,656,860 B2
(45) Date of Patent: May 23, 2023

(54) BUNDLING DATA PACKAGES BASED ON USAGE PATTERNS FOR DOWNLOAD CONTROL

(71) Applicant: Microsoft Technology Licensing, LLC, Redmond, WA (US)

(72) Inventors: Haim Sawdayee, Ganey Tikva (IL); Michael Mushailov, Rosh Haayin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 48 days.

(21) Appl. No.: 17/213,745

(22) Filed: Mar. 26, 2021

(65) Prior Publication Data
US 2022/0308850 A1  Sep. 29, 2022

(51) Int. Cl.
| | | |
|---|---|---|
| *G06F 8/60* | (2018.01) | |
| *G06F 8/70* | (2018.01) | |
| *G06F 11/30* | (2006.01) | |
| *G06F 11/34* | (2006.01) | |

(52) U.S. Cl.
CPC .............. *G06F 8/60* (2013.01); *G06F 8/70* (2013.01); *G06F 11/302* (2013.01); *G06F 11/3438* (2013.01)

(58) Field of Classification Search
CPC . G06F 8/60–70; G06F 11/302; G06F 11/3438
USPC .................................................. 717/168–177
See application file for complete search history.

(56) References Cited

U.S. PATENT DOCUMENTS

| | | | | |
|---|---|---|---|---|
| 1,170,485 | A * | 2/1916 | Layton | B62B 9/14 296/110 |
| 5,758,160 | A * | 5/1998 | McInerney | G06F 8/71 703/2 |
| 6,151,643 | A * | 11/2000 | Cheng | G06F 8/61 709/200 |
| 6,266,810 | B1 * | 7/2001 | Tanaka | H04N 21/8166 348/E5.006 |
| 6,353,926 | B1 * | 3/2002 | Parthesarathy | G06F 8/65 707/999.203 |
| 6,904,449 | B1 * | 6/2005 | Quinones | H04L 67/53 709/219 |
| 6,912,647 | B1 * | 6/2005 | Blandy | G06F 9/3885 712/E9.071 |
| 7,080,051 | B1 * | 7/2006 | Crawford | G06Q 40/12 717/172 |
| 7,290,285 | B2 * | 10/2007 | McCurdy | G06F 21/10 380/231 |

(Continued)

OTHER PUBLICATIONS

Cardosa et al, "Resource Bundles: Using Aggregation for Statistical Large-Scale Resource Discovery and Management", IEEE, pp. 1089-1102 (Year: 2010).*

(Continued)

*Primary Examiner* — Anil Khatri
(74) *Attorney, Agent, or Firm* — Christopher J. Volkmann; Kelly, Holt & Christenson, PLLC

(57) ABSTRACT

Usage data is collected that indicates which code packages are used during a given session. A correlation between the code packages is generated based on the usage data. The code packages are bundled based upon the correlation so that code packages that are normally used together are bundled together. When a request is received, the bundle to which the request belongs is downloaded.

19 Claims, 8 Drawing Sheets

(56) References Cited

U.S. PATENT DOCUMENTS

| | | | | |
|---|---|---|---|---|
| 7,676,803 B2* | 3/2010 | Zhao | ............... | G06F 8/65 |
| | | | | 717/172 |
| 7,840,447 B2* | 11/2010 | Kleinrock | ......... | G06Q 30/0283 |
| | | | | 705/26.63 |
| 8,418,165 B2* | 4/2013 | Hoff | ............... | G06F 8/60 |
| | | | | 717/113 |
| 9,098,375 B2* | 8/2015 | Narkinsky | ............ | G06F 8/658 |
| 9,223,566 B2* | 12/2015 | Charters | ............ | G06F 8/70 |
| 9,456,050 B1* | 9/2016 | Lepeska | ............ | H04L 67/5681 |
| 9,811,327 B2 | 11/2017 | Mark et al. | | |
| 10,182,129 B1 | 1/2019 | Peterson et al. | | |
| 10,314,046 B2* | 6/2019 | Chamarti | ............ | H04W 72/048 |
| 10,552,138 B2* | 2/2020 | Smith | ............ | H04L 9/3247 |
| 10,929,415 B1* | 2/2021 | Shcherbakov | ...... | G06F 3/04842 |
| 10,972,573 B1* | 4/2021 | Lepeska | ............ | H04L 67/5681 |
| 11,157,267 B1* | 10/2021 | Li | ............ | G06F 8/70 |

OTHER PUBLICATIONS

Tomek et al, "Modeling Correlation in Software Recovery Blocks", IEEE, pp. 1071-1086 (Year: 1993).*

Ommering, "Building Product Populations with Software Components", ACM, pp. 255-265 (Year: 2002).*

Franch et al, "Using Quality Models in Software Package Selection", IEEE, pp. 34-41 (Year: 2003).*

Lourakis et al., "SBA: A Software Package for Generic Sparse Bundle Adjustment", ACM, pp. 1-30 (Year: 2009).*

Inozemtseva et al., "Coverage Is Not Strongly Correlated with Test Suite Effectiveness", ACM, pp. 435-445 (Year: 2014).*

Bodhuin, et al., "A Search-Based Approach for Dynamically Re-Packaging Downloadable Applications", In Proceedings of the Conference of the Center for Advanced Studies on Collaborative Research, Oct. 22, 2007, 15 Pages.

"International Search Report and Written Opinion Issued in PCT Application No. PCT/US22/019067", dated Jul. 4, 2022, 11 Pages.

* cited by examiner

BUNDLING DATA PACKAGES BASED ON USAGE PATTERNS FOR DOWNLOAD CONTROL

BACKGROUND

Computing systems are currently in wide use. Some computing systems host applications that are accessed by client computing systems.

For example, some computing systems host productivity applications, such as spreadsheet applications, word processing applications, and slide presentation applications. In order to improve the performance of these applications from a client perspective, code is downloaded to, and run on, client devices. The code packages are partitioned into bundles so that, in order to use the application only a subset of the code partitions are downloaded and run. This reduces the latency in the system because there is no need to transfer, and load all of the code.

The discussion above is merely provided for general background information and is not intended to be used as an aid in determining the scope of the claimed subject matter.

SUMMARY

Usage data is collected that indicates which code packages are used during a given session. A correlation between the code packages is generated based on the usage data. The code packages are bundled based upon the correlation so that code packages that are normally used together are bundled together. When a request for a code package is received, the bundle to which the requested code package belongs is downloaded.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, in order to improve the performance of hosted systems, delay loading of code packages is used. Delay loading of code packages involves identifying code packages that a user is likely to use based upon a request that has been received. In order to do this, the code needs to be partitioned and packaged into bundles. This partitioning of the code allows the system to load only the parts of the code that are needed, thus reducing the load on the system.

The way the code is partitioned directly impacts the performance of the system. For instance, if the code is partitioned into many small bundles, this means that the system needs to load many small resources for any given request, which can lead to an increase in computing system overhead that is needed to service requests. For instance, where multiple small bundles are downloaded, this requires multiple network calls and multiple storage access requests in order to return the many small resources. Where the code is partitioned into a relatively small number of larger files, this means that it is more likely that the system will be loading code that is not necessary (or that is not likely to be used). Again, this creates an increase in overhead, such as bandwidth usage, storage access operations and code initialization operations. Also existing systems bundle code packages by performing a static analysis of the code. Code packages are bundled together if in the static analysis, it is found that the code packages reference one another, or call one another.

The present discussion thus proceeds with respect to utilizing usage data to identify groups of code packages that are often used together and that can be bundled with one another. Then, when a subsequent client request is received for a code package, a user cluster corresponding to the client request is identified and the bundle of code packages to which the requested code package belongs is downloaded to the client, because the bundle will likely contain other code packages that will be used with the requested code package.

Figure 1:
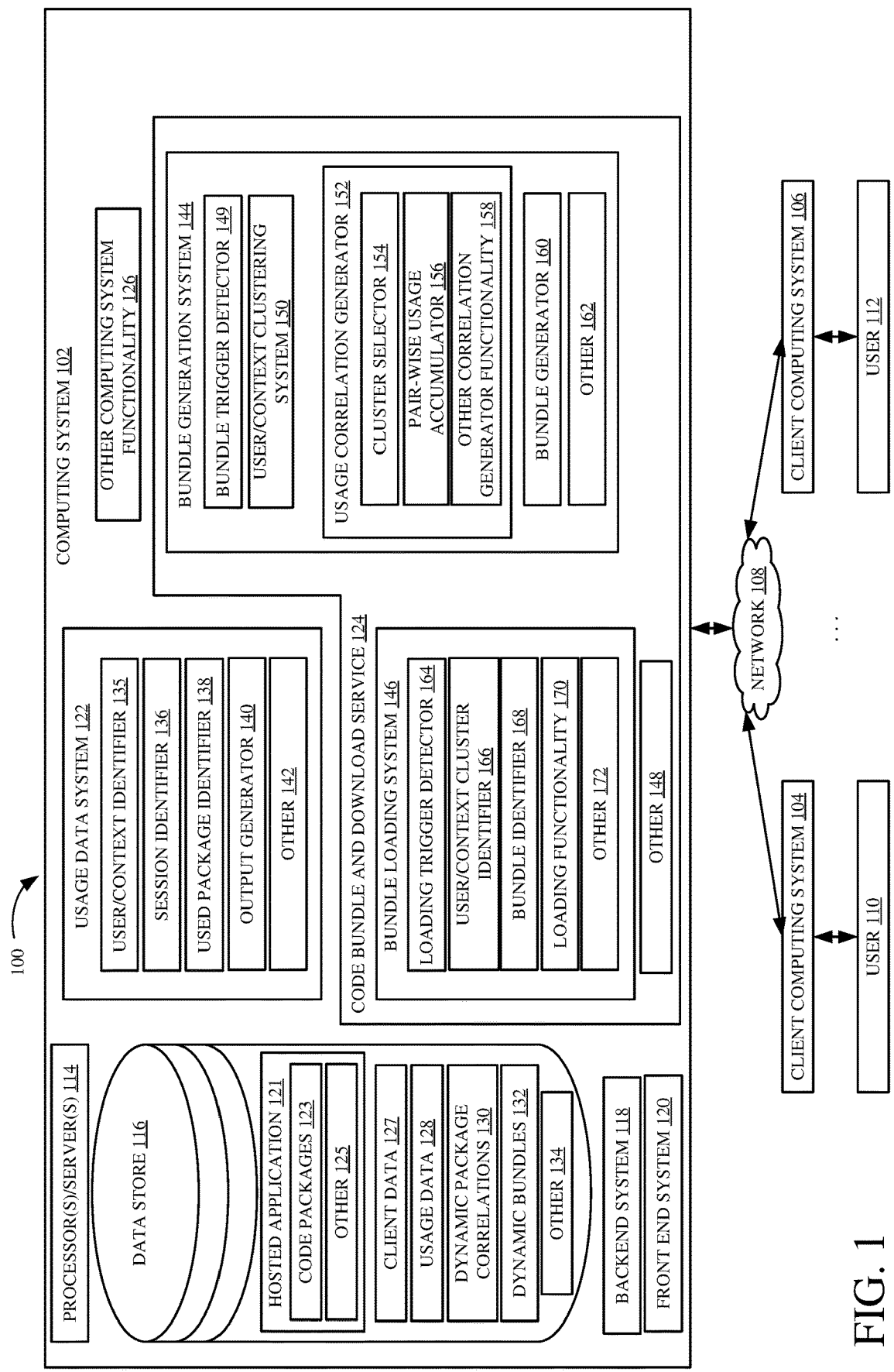
FIG. 1 is a block diagram of one example of a computing system architecture.

FIG. 1 is a block diagram of one example of a computing system architecture 100 which includes computing system 102 that is accessible by client computing systems 104-106 over a network 108. Network 108 can thus be a wide area network, a local area network, a near field communication network, a cellular communication network, or any of a wide variety of other networks or combinations of networks.

In the example shown in FIG. 1, user 110 can interact with client computing system 104 to control and manipulate client computing system 104 and some portions of computing system 102. Similarly, user 112 can interact with client computing system 106 in order to control and manipulate client computing system 106 and some portions of computing system 102.

In the example shown in FIG. 1, computing system 102 includes one or more processors or servers 114, data store 116, back end system 118, front end system 120, usage data system 122, code bundle download service 124, and other computing system functionality 126. Data store 116 can include hosted application 121 that has code packages 123 and other items 125, client (or tenant) data 127, usage data 128, dynamic package correlations 130, dynamic bundles 132, and other items 134. Usage data system 122 can include user/context identifier 135, session identifier 136, used package identifier 138, output generator 140, and other items 142. Code bundle download service 124 can include bundle generation system 144, bundle loading system 146, and other items 148. Bundle generation system 144, itself, can include bundle trigger detector 149, user/context clustering system 150, usage correlation generator 152 (which can include cluster selector 154, pair-wise usage accumulator 156, and other correlation generator functionality 158), bundle generator 160 and other items 162. Bundle loading system 146 can include loading trigger detector 164, user cluster identifier 166, bundle identifier 168, loading functionality 170 and other items 172.

Before describing the overall operation of computing system architecture 100 in more detail, a brief description of some of the items in architecture 100, and their operation, will first be provided. In one example, computing system 102 hosts a service which provides an application 121 to the different client computing systems 104-106. Front end system 120 exposes an interface that handles interactions with the client computing systems 104-106, such as requests for code, requests for data, requests to manipulate client or tenant data 127, etc. Front end computing system 120 provides requests to back end system 118 which executes the requests against client data 127 in data store 116. Back end system 118 can provide the result of executing the operation to front end system 120 which, itself, can provide an output responsive to the request to the requesting client computing system.

Assume for the sake of example that computing system 102 hosts a spreadsheet application for access by client computing systems 104-106. When a user 110 launches the spreadsheet application, the client computing system 104 provides an access request through front end system 120 for a code package 123 that will be downloaded and run on client computing system 104 in order to provide access to the spreadsheet application. As user 110 controls client computing system 104 to perform spreadsheet operations, client computing system 104 may generate requests through front end system 120 to download additional code packages 123 that will be executed in response to the user 110 performing the spreadsheet operations. Downloading code in this way requires back end system 118 to access the application code from data store 116 and provide it to front end system 120 where it can be downloaded through network 108 to the client computing system 104. Therefore, the system attempts to not only download the requested code (the code needed to perform the requested spreadsheet operation), but other code that is likely to be used as well.

In some current systems, as discussed above, the additional code that is downloaded is based upon a prior static analysis of the code. The static analysis identifies relationships between code packages 123 that indicate when one code package calls or otherwise accesses another code package. Therefore, when a first code package needs to be downloaded to perform a requested spreadsheet operation, then based upon the prior static analysis the system will also download other code packages that the initial code package may call on. This, however, is inefficient. A user 110 may never use the additional code packages that are downloaded with the first code package. Therefore, the system performance suffers because there is latency associated with downloading the additional code packages even though they will not be used. Further, the system consumes additional computing system resources in making memory accesses to data store 116, and consumes additional bandwidth in downloading code that may never be used.

The present system, by contrast, uses usage data system 122 to identify usage patterns. By way of example, again continuing with the example in which the hosted service is a spreadsheet application, it may be that whenever a group of users uses a bold operation in the spreadsheet application, they also tend to use an italic operation. This data is captured by usage data system 122 so that when user 110 requests to perform a bold operation, the system not only downloads the code package that allows user 110 to perform the bold operation, but also downloads the code package that allows user 110 to perform an italic operation. This is because those code packages are often used together.

Therefore, bundle download service 124 illustratively provides a service that analyzes the usage data collected by usage data system 122 to identify which code packages should be bundled together. Bundle generation system 174 generates those bundles, and bundle loading system 146 then identifies the particular bundle that should be downloaded in response to a request from a client computing system, and downloads that bundle.

Usage data system 122 obtains usage data from the various client computing systems 104-106. Session identifier 136 identifies a session when it is opened for a particular client computing system 104-106, and used package identifier 138 identifies the particular code packages 123 that are used during that session. Output generator 140 generates an output indicative of the different code packages 123 that are used during a particular session.

The usage data generated by usage data system 122 can be stored as usage data 128 in data store 116.

In some examples, bundle generation system 144 generates bundles that are specific to a certain group of users or a user scenario. For instance, the usage patterns may be different based upon whether the user is a consumer user or an enterprise user. Therefore, when usage data is collected by usage data system 122, user/context identifier 135 identifies the user and/or context corresponding to the usage data. User/context clustering system 150 clusters the users into different clusters so that the code packages can be bundled differently for each cluster of users, based upon the usage data generated for each cluster of users.

Usage correlation generator 152 then generates a correlation between the different code packages 123 in hosted application 121. To generate the correlation, cluster selector 154 first selects a user or context cluster for which code packages 123 are to be bundled. Pair-wise usage accumulator 156 then generates a pair-wise value for each different pair of code packages 123. The pair-wise usage accumulator generates the value for each pair based upon how often the two packages in the pair are used with one another in a single session. The pair-wise value may be a count of the number of sessions in which the two code packages in the pair were used together or a different value. The package correlations can be stored as dynamic package correlations 130 in data store 116 and can be modified dynamically as different triggers are detected.

Other correlation generator functionality 158 can generate correlations between the different sets of code packages 123 in other ways.

Once the correlations between the different code packages 123 have been generated, bundle generator 160 bundles the code packages into bundles based upon the correlation. For instance, for a given cluster of users or contexts, bundle generator 160 may run an algorithm based upon the correlation data to find optimal or desired partitions in the code packages to define the code package bundles. An algorithm for instance, can be run to maximize the average score of each pair of code packages in the same bundle. One such algorithm in a simulated annealing algorithm, which is a global optimization algorithm. However, other algorithms such as gradient descent or other algorithms may be used as well. Once the code packages are bundled into bundles for the selected cluster, then cluster selector 154 can select the next cluster for which bundling is to be performed. This can continue for each cluster until all clusters have a corresponding set of bundled code packages.

In one example, the code bundling is performed dynamically in that it is repeated under certain circumstances. Bundle trigger detector 149 detects when it is time to perform a bundling operation. In one example, the code packages are bundled dynamically, by repeating the bundling operation each time for instance, a bundling trigger is detected. Thus, a bundling trigger may be detected when a new code package 123 or a set of new code packages 123 are added to the application. In that case, the new code package(s) 123 can be bundled with other already-existing code packages 123. In another example, a bundling trigger can be detected when a threshold amount of additional usage data has been collected. It may be, for instance, that the contents of the bundles change over time, because uses tend to use more or less functionality, or to use the application functionality in different ways over time. Because the bundling operation is performed dynamically, these usage patterns will be taken into account in bundling code packages. The dynamic bundles 132 can be stored in data store 116. Each bundle 132 can be stored, in one example, as a Java Script file containing the code packages 123 in that bundle. This is just one example.

Bundle loading system 146 receives requests from a client computing system and identifies the particular bundle 132 of code packages that need to be downloaded in response to the request. Loading trigger detector 164 detects a loading trigger, indicating that a bundle 132 is to be downloaded, based on a variety of different criteria. For instance, when a user 110 launches an application, an initial bundle 132 of code packages may be downloaded. Then, as the user performs operations within the application, other requests for code packages to perform those operations will be received and the bundle 132 containing the requested code package is identified and downloaded by bundle loading system 146. Loading trigger detector 164 thus detects a loading trigger in response to requests received from the various client computing systems 104-106.

When a request is received by bundle loading system 146, user cluster identifier 166 identifies the cluster to which the requesting user (the user of the client computing system that is making the request) belongs. For instance, where the users 110-112 are clustered based upon whether they are consumer users or enterprise users, then some information will be provided along with the request to indicate whether user 110 is a consumer user or an enterprise user. In yet another example, the various users 110-112 may be clustered based upon their user profile information. In that case, the identity of the requesting user 110 will be received along with the request (or at another time) so that the user's profile information can be accessed to identify the particular user cluster that the requesting user 110 belongs to. In another example, once a user profile is configured, the user corresponding to that profile is assigned to a cluster so that the cluster will already be known, when the user 110 begins using the hosted application. Identifying the cluster to which the requesting user belongs can be done in other ways as well.

Once the user cluster is identified, by user/context cluster identifier 166 bundle identifier 168 identifies the bundle that contains the code package 123 that is requested in the request. Loading functionality 170 obtains that bundle 132 and downloads it to the requesting client computing system.

Figure 2:
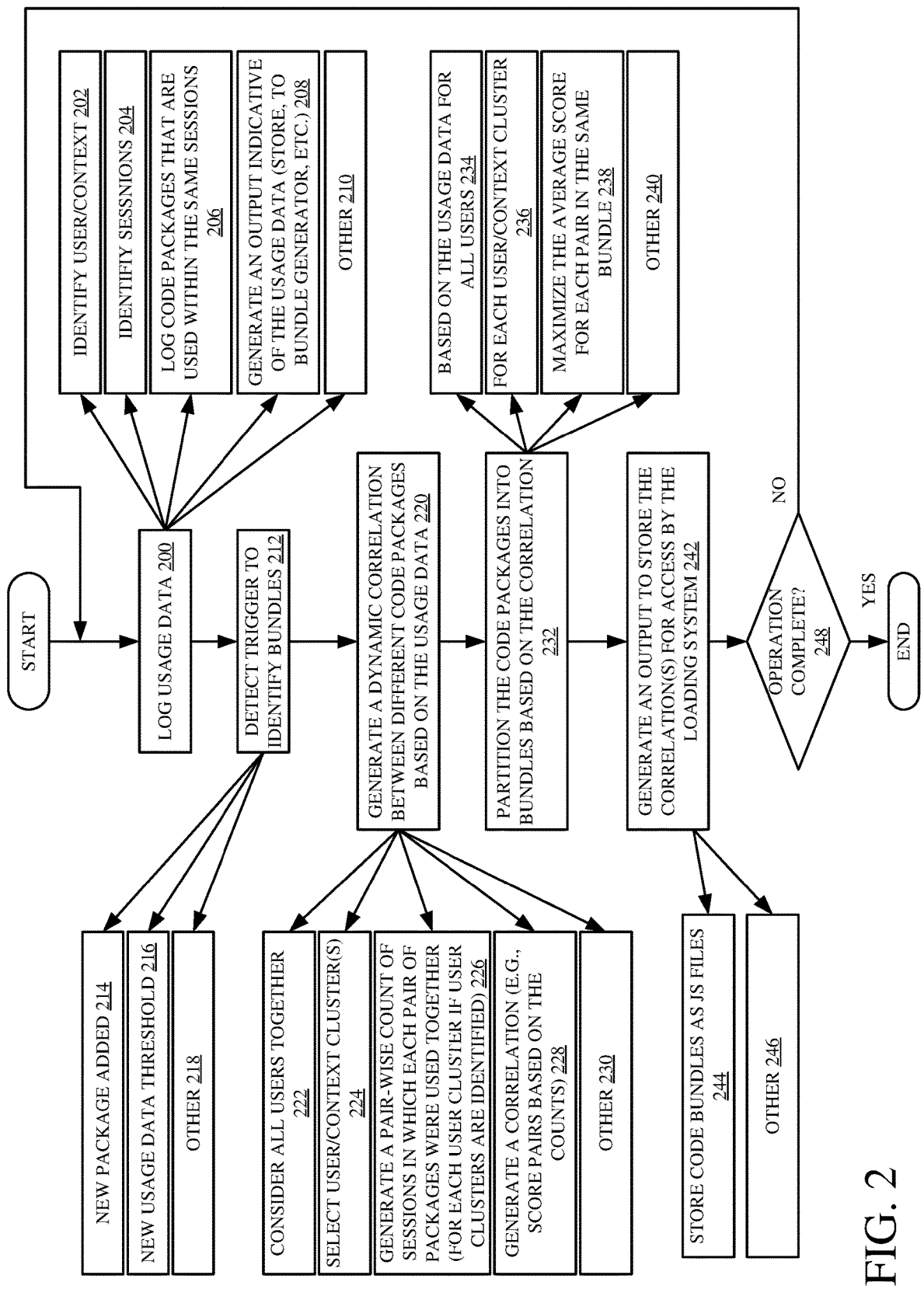
FIG. 2 is a flow diagram illustrating one example of the operation of a computing system architecture such as that shown in FIG. 1.

FIG. 2 is a flow diagram illustrating one example of the operation of computing system architecture 100 in logging usage data and generating bundles based upon the usage data. It is first assumed that usage data system 122 is logging usage data for the various users 110-112 and/or the various contexts or other clustered groups. Logging usage data is indicated by block 200 in the flow diagram of FIG. 2. In order to log the usage data, user/context identifier 135 identifies the user or context for which the usage data is being logged, as indicated by block 202. For instance, if the clusters are defined on whether the user is a consumer user or an enterprise user, then that context is identified. If the clusters are defined based on user profiles, then the user profile information that determines the user's cluster is identified.

Session identifier 136 identifies the particular session that has been opened and used package identifier 138 identifies and logs the code packages 123 that are used within that particular session. Identifying the sessions is indicated by block 204 and identifying the code packages 123 used within the session is indicated by block 206. Output generator 140 generates an output indicative of the usage data. The output can be in the form of data to be stored as usage data 128 in data store 116 or in other forms. Generating an output is indicated by block 208. Logging or otherwise storing the usage data is indicated by block 210.

Bundle trigger detector 149 eventually detects a trigger indicating that the bundle 132 process is to be performed in order to dynamically bundle the code packages 123 into bundles 132. Detecting the trigger is indicated by block 212 in the flow diagram of FIG. 2. The trigger can be detected based upon the addition of a new code package 123 to the application, as indicated by block 214. The trigger can be detected based upon a threshold amount of new usage data being collected by usage data system 122, as indicated by block 216. Detecting bundle triggers can be done in other ways as well, as indicated by block 218.

Usage correlation generator 152 then generates correlations between the code packages 123 based upon the usage data. Generating a dynamic correlation between different packages based on the usage data is indicated by block 220 in the flow diagram of FIG. 2. In one example, usage correlation generator 152 generates correlations among the different code packages 123 based on usage data for all users, in the aggregate. Considering all users together in generating bundles 132 is indicated by block 222. In another example, where code packages 123 are bundled differently for different clusters, then cluster selector 154 selects a user/context cluster within which code packages 123 are to be bundled. Selecting a user/context cluster is indicated by block 224 in the flow diagram of FIG. 2.

Pair-wise usage accumulator 156 then enumerates all of the different possible pairs of code packages 123 and generates a pair-wise count of sessions in which each pair of packages 123 were used together. The pair-wise counts can be generated separately for each cluster. Generating a pair-wise count of sessions in which pairs of packages 123 are used together is indicated by block 226 in the flow diagram of FIG. 2. Also, in another example, accumulator 156 need not enumerate all possible pairs, but instead only those pairs actually used together in a session.

Pair-wise usage accumulator 156 can also generate a correlation among the code packages 123 based upon the values assigned to the pairs. For instance, each of the different pairs can be scored based upon the session counts accumulated by accumulator 156. Generating a correlation among the different code packages 123 is indicated by block 228 in the flow diagram of FIG. 2. The correlation can be generated as the accumulated session counts of sessions in which the pair of code packages 123 was used, or in other ways as well, as indicated by block 230.

Once a correlation has been generated among the different code packages 123, bundle generator 160 partitions the code packages 123 into bundles 132 based upon the correlations. Generating bundles 132 of code packages 123 based on the correlations is 130 indicated by block 232 in the flow diagram of FIG. 2. Again, the bundles can be generated for all users together, as indicated by block 234. The bundles 132 can also be generated separately for each user/context cluster, as indicated by block 236. In one example, an algorithm is run on the correlations (or scores) to maximize the average score for each pair of code packages 123 in the same bundle 132. This can be done using a simulated annealing algorithm or in other ways. Generating the bundles by maximizing the average score for each pair of code packages 123 in the same bundle is indicated by block 238 in the flow diagram of FIG. 2. Bundles can be generated in other ways 240 as well.

Usage correlation generator 152 can generate an output to store the dynamic package correlations 130 for access by the loading system 146. Storing the correlations 130 is indicated by block 242 in the flow diagram of FIG. 2. In one example, the bundled partitions are also stored as dynamic bundles 132. The dynamic bundles 132 can be stored as JavaScript files or in other ways, as indicated by block 244 in the flow diagram of FIG. 2. Outputting the correlations 130 and/or the bundles 132 can be done in a wide variety of other ways as well, as indicated by block 246.

As discussed elsewhere, the bundles 132 are illustratively generated dynamically, meaning that the bundling operation can be performed multiple times, based upon when bundling trigger criteria are detected. Therefore, until the operation is complete, as indicated by block 248, processing reverts to block 200 where additional usage data can be collected.

Figure 3:
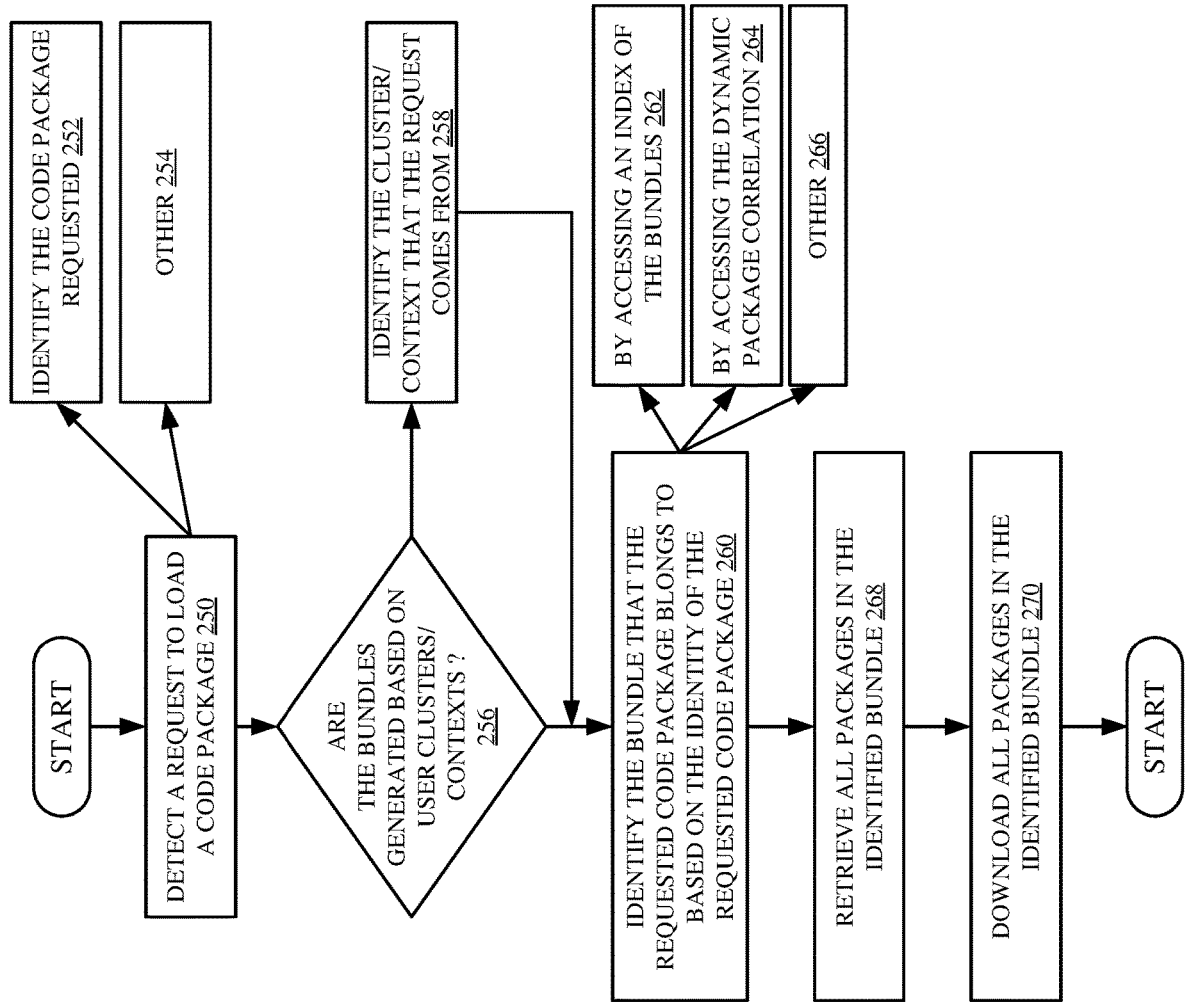
FIG. 3 is a flow diagram illustrating one example of the operation of an architecture such as that shown in FIG. 1 in receiving a request, identifying a bundle to download, and downloading the bundle in response to the request.

FIG. 3 is a flow diagram illustrating one example of the operation of a computing system architecture, such as that shown in FIG. 1, in receiving a request for a code package 123 from a client computing system, and identifying a dynamic bundle 132 that contains the requested package 123, and downloading that bundle 132 to the client computing system. It is first assumed that front end system 120 detects a request from a client computing system (such as client computing system 104) to load a code package 123. For instance, it may be that user 110 has launched application 121 and has provided inputs to perform an operation. The code that enables that operation may then be downloaded to client computing system 104 to enable user 110 to perform the operation.

Front end system 120 illustratively provides the request to code bundle loading service 124 to find and download the correct code. Detecting a request to load a code package 123 may be a trigger that is detected by loading trigger detector 164. Detecting the request to load a code package is indicated by block 250 in the flow diagram of FIG. 3. The identity of the code package 123 that is being requested is illustratively included in the request, as indicated by block 252. Detecting a request to load a code package 123 can be performed in other ways as well, as indicated by block 254.

As discussed above, it may be that there are different sets of dynamic bundles 132 for different clusters of users or contexts. In another example, there may be one set of dynamic bundles 132 for all users, regardless of the user identity or context (or other clustering criteria). Determining whether the bundles 132 are generated based on user clusters or context or other clustering criteria is indicated by block 256 in the flow diagram of FIG. 3.

Assume, for the sake of discussion, that bundle generation system 144 generates a plurality of different sets of dynamic bundles 132, where one set of bundles 132 corresponds to a particular user or context cluster (or a cluster generated based on other cluster criteria). In that case, the cluster corresponding to the request is first identified so the proper set of bundles 132 can be accessed. Therefore, user/context cluster identifier 166 in bundle loading system 146 identifies the user cluster corresponding to the request. Identifying the cluster corresponding to the request is indicated by block 258 in the flow diagram of FIG. 3. For example, if clusters are generated based on user profile information, cluster identifier 166 can determine which user cluster the user 110 belongs to. If clusters are generated based on user context, then cluster identifier 166 can determine the context that the request is in (e.g., the context that user 110 and client computing system 104 are in (such as consumer, enterprise, etc.). If clusters are generated based on geographic location, then cluster identifier 166 can identify the geographic location where the requesting client computing system 104 resides. Other cluster criteria corresponding to the request can be used by cluster identifier 166 to identify the particular cluster that corresponds to the request.

Bundle identifier 168 thus identifies, in the set of bundles 132 corresponding to the cluster for the requesting user, the bundle 132 that contains the requested code package belongs to, based upon the identity of the requested code package. Identifying the bundle that the requested code package belongs to is indicated by block 260 in the flow diagram of FIG. 3. This can be done in a variety of different ways. For instance, the dynamic bundles 132 may have an index based upon the different code packages. Therefore, once the identity of the requested code package is identified, that requested code package can be used to access the index to therefore identify the bundle 132 that the requested code package belongs to. Accessing an index to identify the dynamic bundle 132 is indicated by block 262. In another example, the dynamic package correlations 130 may have identifiers that identify the bundles 132 which contain the different code packages 123. In that case, bundle identifier 168 can access the dynamic package correlations 130 to identify the bundle 132 containing the requested code package 123. Accessing the dynamic package correlations 130 to identify the dynamic bundle 132 is indicated by block 264 in the flow diagram of FIG. 3. The bundle 132 that the requested code package 123 belongs to can be identified in other ways as well, as indicated by block 266.

Loading functionality 170 then retrieves all of the code packages 123 in the identified bundle 132 and downloads those packages 123 to the requesting client computing system (in this example, client computing system 104). Receiving all of the packages 123 in the identified bundle 132 is indicated by block 268 in the flow diagram of FIG. 3. In one example, each dynamic bundle 132 is a JavaScript file containing the code packages for that particular bundle. Thus, loading functionality 170 can obtain the JavaScript file and download that to client computing system 104. Retrieving the packages in the identified bundle 132 can be done in other ways as well.

Downloading the packages 123 in the identified bundle 132 to the requesting client computing system 104 is indicated by block 270 in the flow diagram of FIG. 3. Again, this can be done by downloading the JavaScript file that contains the code packages 123 in the identified bundle, or in other ways, such as downloading dynamic list libraries (DLL(s)) or other structures.

It can thus be seen that the present discussion describes a system which uses delay loading of code packages in order to enhance the performance of a hosted application, but does so in a very efficient way. Instead of performing a static analysis on the code packages and using the results of that analysis to partition or bundle the code packages for delay loading of the code packages, the present discussion describes a system that bundles the code packages based on usage data. This enhances the likelihood that the downloaded code will actually be used, and reduces the likelihood of downloading code that will not be used, or failing to download code that will be used. The present discussion also proceeds with respect to a system that can generate different sets of bundles for different clusters of users. The user clustering can be done based on user profile information, the context in which the user operates, the geographic location of the user, and/or any of a wide variety of other clustering criteria. Thus, this further enhances the likelihood that the code packages that are likely to be used will actually be downloaded, but code packages that are unlikely to be used are not downloaded. This enhances the performance of the computing system in that it reduces unneeded latency, reduces the computing system resources that are used, and enhances the speed at which the system performs.

It should also be noted that, while the present discussion has proceeded with respect to code packages for a hosted application, the present description can be equally useful in other scenarios. For instance, the present system can be used as a code bundle and download service that is called upon, based upon requests received from client computing systems, to generate code bundles, and to download the desired bundles during operation. The present system can be applied in situations where the downloaded information is not a bundle of application code packages, but is instead information which may constitute a different type of resource, such as images, video, audio files, etc. The bundling of data and downloading of data as described above can be used for any over-the-wire transmission of data, such as sending images to gaming consoles, sending audio clips, video files, or other content that needs to be transferred.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. The displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, they can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, the actuators can be actuated using touch gestures. Also, where the device that displays them has speech recognition components, the actuators can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
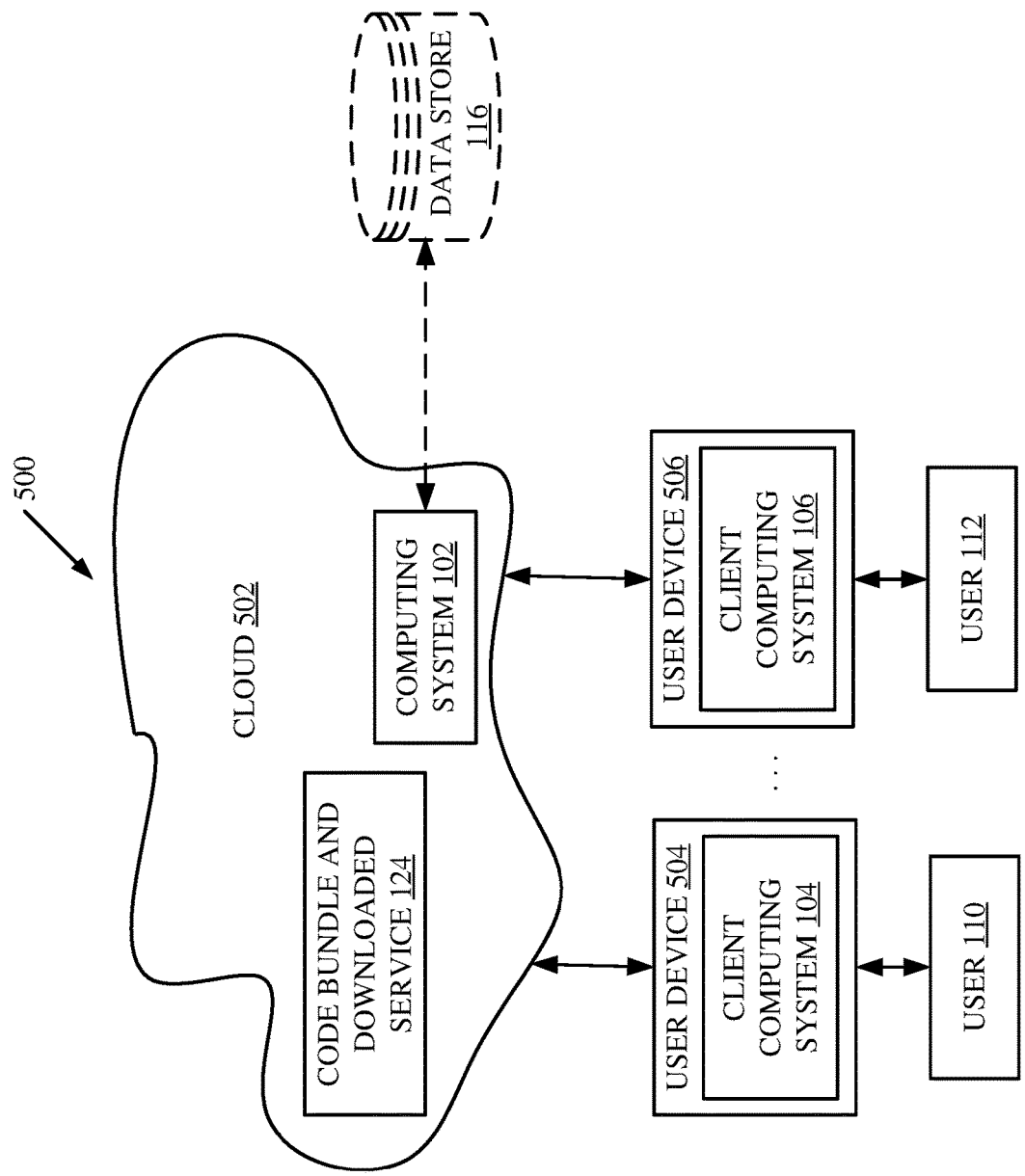
FIG. 4 is a block diagram showing one example of a computing system architecture, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that computing system 102 can be located in cloud 502 (which can be public, private, or a combination where portions are public while others are private). Therefore, users 110-112 uses a user devices 504-506 to access those systems through cloud 502.

Figure 6:
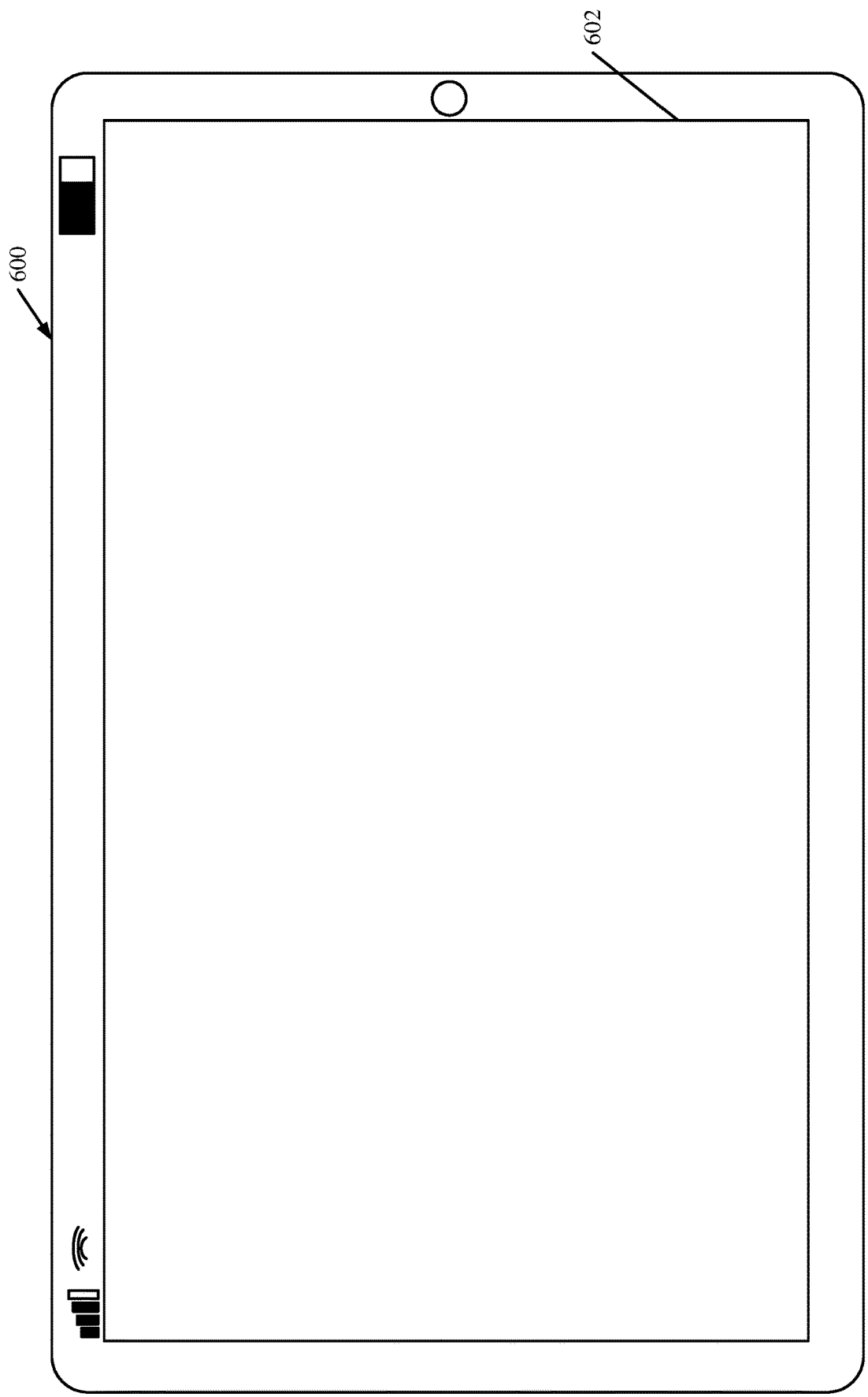

FIG. 4 also depicts another example of a cloud architecture. FIG. 6 shows that it is also contemplated that some elements of computing system 102 can be disposed in cloud 502 while others are not. By way of example, data store 116 can be disposed outside of cloud 502, and accessed through cloud 502. In another example, code bundle and downloaded service 124 is separate from, and exposes an interface to, computing system 102. Regardless of where they are located, they can be accessed directly by devices 504-506 or computing system 102, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
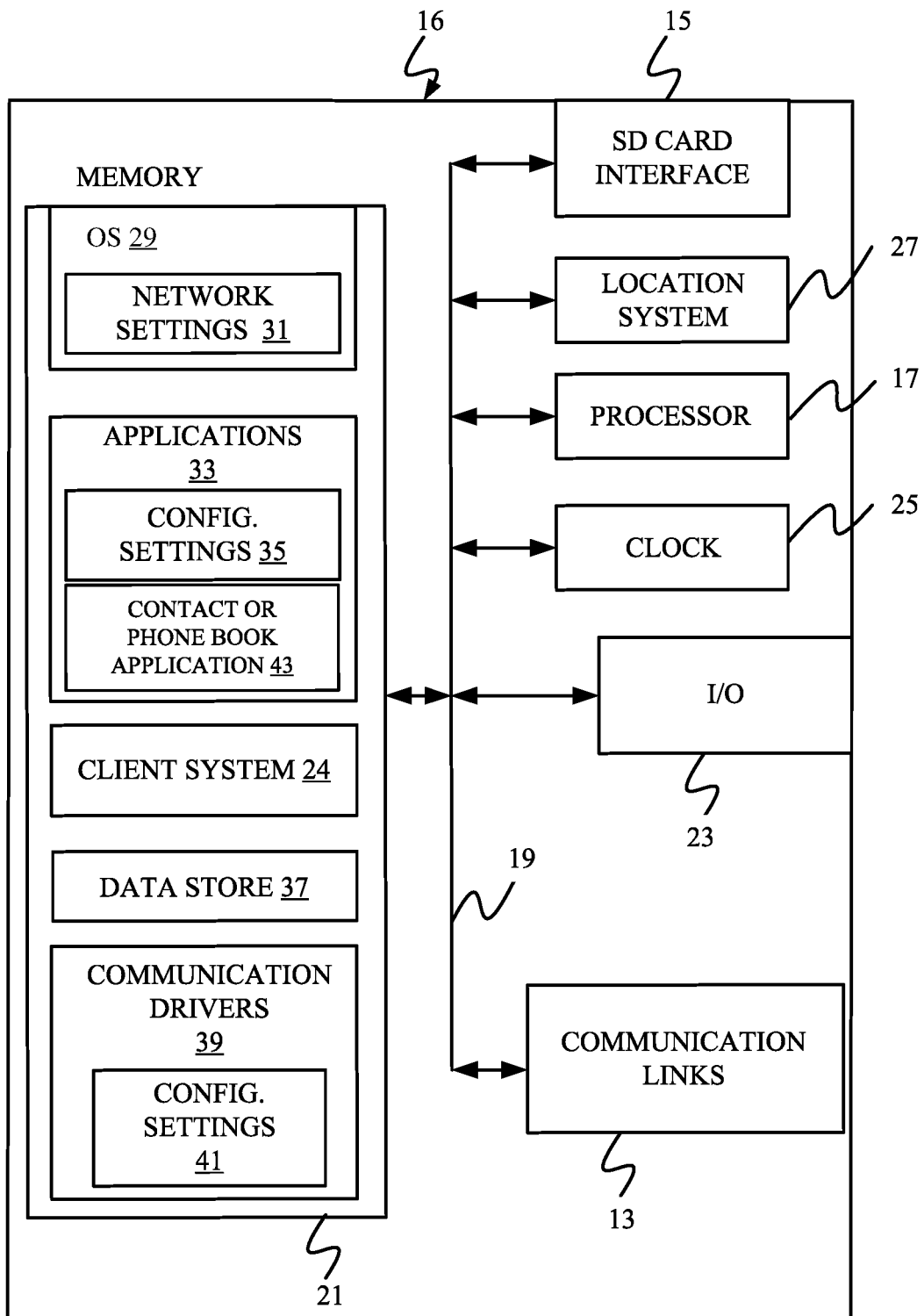
FIGS. 5-7 show examples of mobile devices that can be used in the architectures shown in the previous figures.
Figure 7:
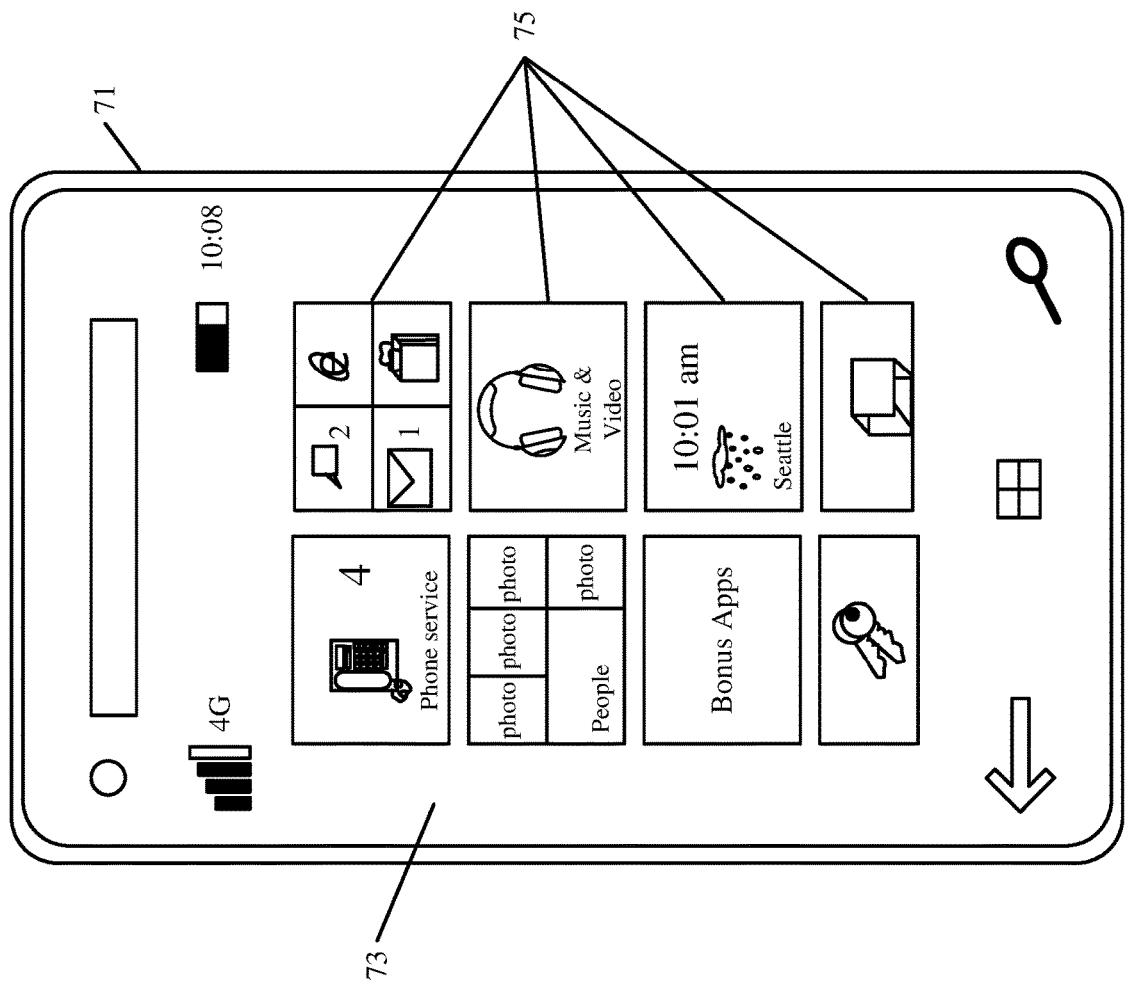

FIG. 5 is a simplified block diagram of one illustrative example of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components computing system 102 or user devices 504-506 or system 116 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G, 4G and 5G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
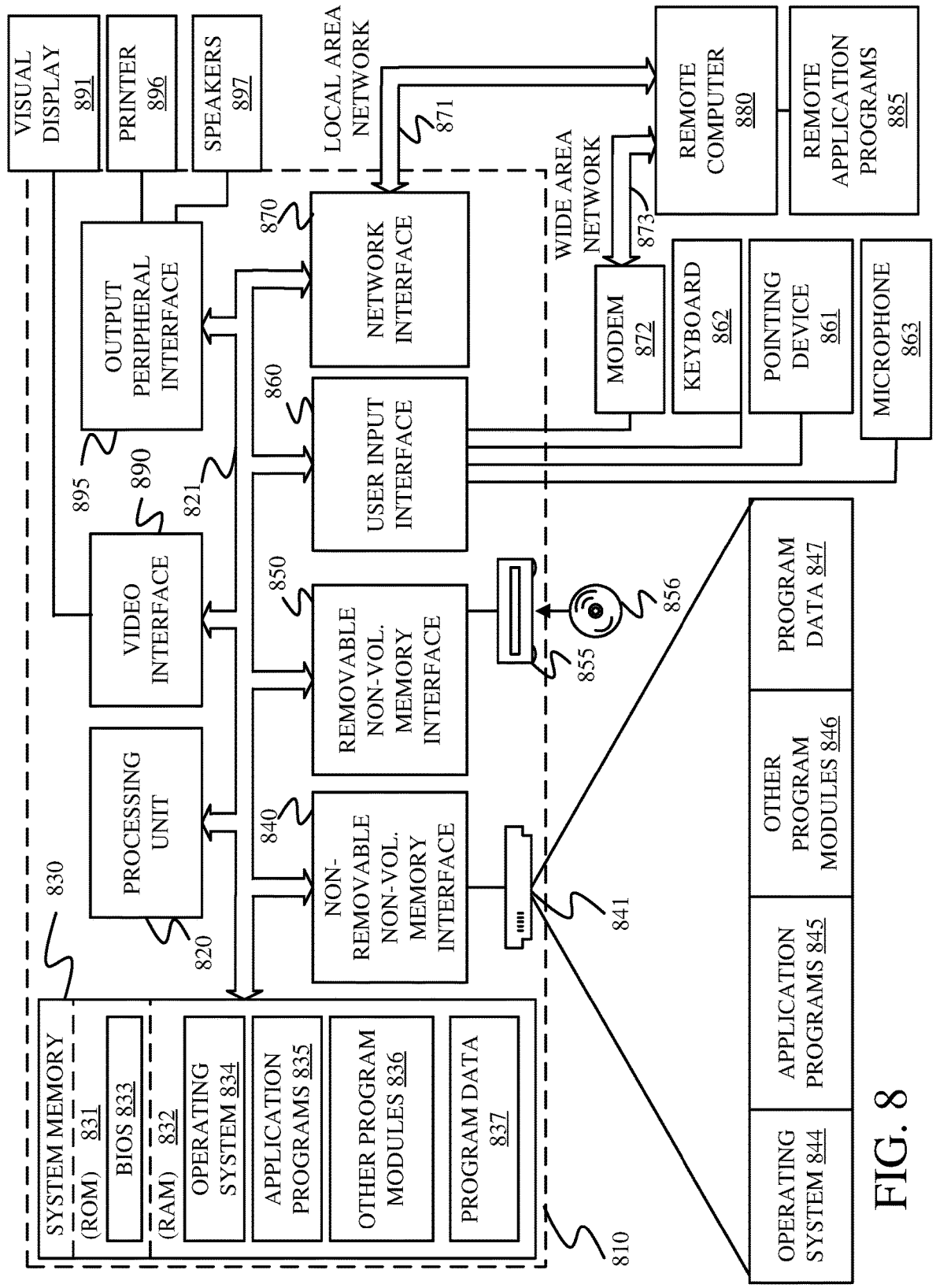
FIG. 8 is a block diagram showing one example of a computing environment that can be used in the architectures shown in the previous figures.

FIG. 8 is one example of a computing environment in which architecture 100, or parts of it, (for example) can be deployed. With reference to FIG. 8, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer system, comprising:

at least one processor;

a usage correlation generator, implemented by the at least one processor, that accesses usage data indicative of usage of multiple different information packages, of a hosted application, by a user in a session in which the user interacts with the hosted application and that generates a correlation between different subsets of information packages, in the multiple different information packages, based on the usage data;

a bundle generator, implemented by the at least one processor, that bundles the multiple different information packages into bundles of information packages based on the correlation; and a bundle trigger detector, implemented by the at least one processor, that detects a bundling trigger wherein the usage correlation generator repeats the steps of accessing usage data and generating a correlation, and wherein the bundle generator repeats the step of bundling, based on detection of the bundling trigger.

Example 2 is the computer system of any or all previous examples and further comprising:

a bundle loading system configured to receive a request for a requested information package from a client computing system;

a bundle identifier configured to identify a bundle of information packages that include the requested information package; and loading functionality configured to download the identified bundle of information packages to the client computing system.

Example 3 is the computer system of any or all previous examples wherein the usage correlation generator comprises:

a pair-wise usage accumulator configured to pair each of the information packages in the multiple different information packages with each of the other information packages in the multiple different information packages and for each pair of information packages, generate a metric indicative of a count of a number of sessions in which the information packages in the pair were both used.

Example 4 is the computer system of any or all previous examples wherein the bundle generator is configured to identify, as a bundle of information packages, a combination of information packages in which pairs of the information packages in the combination of information packages have metric values that meet a threshold metric value.

Example 5 is the computer system of any or all previous examples and further comprising:

a clustering system configured to generate clusters of users based on the usage data and based on clustering criteria, wherein the usage correlation generator is configured to select a cluster of users and access usage data for the selected cluster of users, indicative of usage of multiple different information packages of a hosted application, by users in the selected cluster of users in a session in which the users in the selected cluster of users interact with the hosted application and to generate a correlation corresponding to the selected cluster between different subsets of information packages, in the multiple different information packages, based on the usage data for the selected cluster.

Example 6 is the computer system of any or all previous examples wherein the bundle generator is configured to generate a set of bundles corresponding to the selected cluster by bundling, for the selected cluster, the multiple different information packages into bundles of information packages based on the correlation corresponding to the selected cluster.

Example 7 is the computer system of any or all previous examples wherein the request includes cluster information that is indicative of a cluster of users from which the request is received and which corresponds to the request and wherein the bundle loading system comprises:

a cluster identifier configured to identify the cluster of users corresponding to the request and wherein the bundle identifier is configured to identify the set of bundles corresponding to the identified cluster of users corresponding to the request and identify the bundle within the set of bundles corresponding to the request.

Example 8 is a computer implemented method, comprising:

accessing usage data indicative of usage of multiple different information packages, of a hosted application, by a user in a session in which the user interacts with the hosted application;

generating a correlation between different subsets of information packages, in the multiple different information packages, based on the usage data;

bundling the multiple different information packages into bundles of information packages based on the correlation;

detecting a bundling trigger; and repeating the steps of accessing usage data, generating a correlation, and bundling based on detection of the bundling trigger.

Example 9 is the computer implemented method of any or all previous examples and further comprising:

receiving a request for a requested information package from a client computing system;

identifying a bundle of information packages that include the requested information package; and downloading the identified bundle of information packages to the client computing system.

Example 10 is the computer implemented method of any or all previous examples wherein generating a correlation comprises:

pairing each of the information packages in the multiple different information packages with each of the other information packages in the multiple different information packages;

for each pair of information packages, generating a metric indicative of a count of a number of sessions in which the information packages in the pair were both used.

Example 11 is the computer implemented method of any or all previous examples wherein bundling comprises:

identifying, as a bundle of information packages, a combination of information packages in which pairs of the information packages in the combination of information packages have metric values that meet a threshold metric value.

Example 12 is the computer implemented method of any or all previous examples and further comprising:

generating clusters of users based on the usage data and based on clustering criteria.

Example 13 is the computer implemented method of any or all previous examples and further comprising selecting a cluster of users and wherein accessing usage data comprises:

accessing usage data for the selected cluster of users, indicative of usage of multiple different information packages of a hosted application, by users in the selected cluster of users in a session in which the users in the selected cluster of users interact with the hosted application.

Example 14 is the computer implemented method of any or all previous examples wherein generating a correlation comprises:

generating a correlation corresponding to the selected cluster between different subsets of information packages, in the multiple different information packages, based on the usage data for the selected cluster.

Example 15 is the computer implemented method of any or all previous examples wherein bundling comprises:

generating a set of bundles corresponding to the selected cluster by bundling, for the selected cluster, the multiple different information packages into bundles of information packages based on the correlation corresponding to the selected cluster.

Example 16 is the computer implemented method of any or all previous examples and further comprising:

repeating the steps of selecting a cluster, accessing usage data for the selected cluster, generating a correlation corresponding to the selected cluster, and generating a set of bundles for the selected cluster, for each of the clusters of users.

Example 17 is the computer implemented method of any or all previous examples wherein the request includes cluster information that is indicative of a cluster of users from which the request is received and which corresponds to the request and wherein identifying a bundle of information packages that include the requested information package comprises:

identifying the cluster of users corresponding to the request;

identifying the set of bundles corresponding to the identified cluster of users corresponding to the request; and identifying the bundle within the set of bundles corresponding to the request.

Example 18 is the computer implemented method of any or all previous examples wherein generating clusters of users based on the usage data and based on clustering criteria comprises:

generating clusters of users based on the usage data and based on at least one of user context data or user profile data.

Example 19 is the computer implemented method of any or all previous examples wherein the information packages comprise code packages, each code package implementing a set of functionalities of the hosted application, and wherein bundling comprises:

bundling multiple different code packages into a Java Script file.

Example 20 is a hosted computing system service, comprising:

at least one processor;

a usage correlation generator, implemented by the at least one processor, that accesses usage data indicative of usage of multiple different information packages, of a hosted application, by a user in a session in which the user interacts with the hosted application and that generates a correlation between different subsets of information packages, in the multiple different information packages, based on the usage data;

a bundle generator, implemented by the at least one processor, that bundles the multiple different information packages into bundles of information packages based on the correlation;

a bundle trigger detector, implemented by the at least one processor, that detects a bundling trigger wherein the usage correlation generator repeats the steps of accessing usage data and generating a correlation, and wherein the bundle generator repeats the step of bundling, based on detection of the bundling trigger;

a bundle loading system configured to receive a request for a requested information package from a client computing system;

a bundle identifier configured to identify a bundle of information packages that include the requested information package; and loading functionality configured to download the identified bundle of information packages to the client computing system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:

at least one processor; and memory storing instructions executable by the at least one processor, wherein the instructions, when executed, cause the computer system to:

access usage data indicative of usage of multiple different information packages, of a hosted application, by a user in a session in which the user interacts with the hosted application;

pair each of the information packages in the multiple different information packages with each of the other information packages in the multiple different information packages;

for each pair of information packages, generate a metric indicative of a count of a number of sessions in which the information packages in the pair were both used based on the usage data;

generate a correlation between different subsets of information packages, in the multiple different information packages, based on the metrics indicative of the counts;

bundle the multiple different information packages into a plurality of bundles of information packages based on the correlation;

receive a request for a requested information package from a client computing system;

identify a particular bundle of information packages, of the plurality of bundles of information packages, that includes the requested information package; and download the particular bundle of information packages to the client computing system.

2. The computer system of claim 1 wherein the correlation comprises a dynamic correlation, and the instructions, when executed, cause the computer system to:

based on a bundling trigger, repeat the accessing usage data, generating the dynamic correlation, and bundling the multiple different information packages.

3. The computer system of claim 1 wherein the usage data indicates, for each respective information package, of the multiple different information packages, one or more sessions in which the user interacted with the hosted application and the respective information package was used, and the instructions, when executed, cause the computer system to:

pair each of the information packages by identifying a plurality of pairs of information packages, wherein each pair of information packages, in the plurality of pairs of information packages, includes respective first and second information packages of the multiple different information packages;

for each respective pair of information packages of the plurality of pairs of information packages, generate the metric indicative of a count of a number of same sessions, of the set of sessions, in which the respective first and second information packages, of the respective pair of information packages, were both used.

4. The computer system of claim 1 wherein the instructions, when executed, cause the computer system to:

identify, as a bundle of information packages, a combination of information packages in which pairs of the information packages in the combination of information packages have correlation metrics that meet a threshold metric value.

5. The computer system of claim 1, wherein the instructions, when executed, cause the computer system to:

generate clusters of users based on the usage data and based on clustering criteria;

select a cluster of users;

access usage data for the selected cluster of users, indicative of usage of multiple different information packages of a hosted application, by users in the selected cluster of users in a session in which the users in the selected cluster of users interact with the hosted application; and generate a correlation corresponding to the selected cluster between different subsets of information packages, in the multiple different information packages, based on the usage data for the selected cluster.

6. The computer system of claim 5 wherein the instructions, when executed, cause the computer system to generate a set of bundles corresponding to the selected cluster by bundling, for the selected cluster, the multiple different information packages into bundles of information packages based on the correlation corresponding to the selected cluster.

7. The computer system of claim 6 wherein the request includes cluster information that is indicative of a cluster of users from which the request is received and which corresponds to the request and wherein the instructions, when executed, cause the computer system to:

identify the cluster of users corresponding to the request;

identify the set of bundles corresponding to the identified cluster of users corresponding to the request; and identify the bundle within the set of bundles corresponding to the request.

8. A computer implemented method, comprising:

accessing usage data indicative of usage of multiple different information packages, of a hosted application, by a user in a set of sessions in which the user interacts with the hosted application;

identifying a plurality of pairs of information packages, wherein each pair of information packages, in the plurality of pairs of information packages, includes respective first and second information packages of the multiple different information packages;

for each respective pair of information packages of the plurality of pairs of information packages, generating a correlation metric based on the usage data, the correlation metric indicating a count of a number of same sessions, of the set of sessions, in which the respective first and second information packages of the respective pair of information packages were both used;

bundling the multiple different information packages into a plurality of bundles of information packages based on the correlation metrics;

receiving a request for a requested information package from a client computing system;

identifying a particular bundle of information packages, of the plurality of bundles of information packages, that includes the requested information package; and downloading the particular bundle of information packages to the client computing system.

9. The computer implemented method of claim 8 and further comprising:

based on a bundling trigger, repeating the accessing usage data, generating a correlation, and bundling.

10. The computer implemented method of claim 8 wherein bundling comprises:

identifying, as a bundle of information packages, a combination of information packages in which pairs of the information packages in the combination of information packages have correlation metrics that meet a threshold metric value.

11. The computer implemented method of claim 8 and further comprising:

generating clusters of users based on the usage data and based on clustering criteria.

12. The computer implemented method of claim 11 and further comprising selecting a cluster of users and wherein accessing usage data comprises:

accessing usage data for the selected cluster of users, indicative of usage of multiple different information packages of a hosted application, by users in the selected cluster of users in a session in which the users in the selected cluster of users interact with the hosted application.

13. The computer implemented method of claim 12 wherein generating a correlation comprises:

generating a correlation corresponding to the selected cluster between different subsets of information packages, in the multiple different information packages, based on the usage data for the selected cluster.

14. The computer implemented method of claim 13 wherein bundling comprises:

generating a set of bundles corresponding to the selected cluster by bundling, for the selected cluster, the multiple different information packages into bundles of information packages based on the correlation corresponding to the selected cluster.

15. The computer implemented method of claim 14 and further comprising:

repeating the steps of selecting a cluster, accessing usage data for the selected cluster, generating a correlation corresponding to the selected cluster, and generating a set of bundles for the selected cluster, for each of the clusters of users.

16. The computer implemented method of claim 15 wherein the request includes cluster information that is indicative of a cluster of users from which the request is received and which corresponds to the request and wherein identifying a bundle of information packages that include the requested information package comprises:

identifying the cluster of users corresponding to the request;

identifying the set of bundles corresponding to the identified cluster of users corresponding to the request; and identifying the bundle within the set of bundles corresponding to the request.

17. The computer implemented method of claim 11 wherein generating clusters of users based on the usage data and based on clustering criteria comprises:
 generating clusters of users based on the usage data and based on at least one of user context data or user profile data.

18. The computer implemented method of claim 8 wherein the information packages comprise code packages, each code package implementing a set of functionalities of the hosted application, and wherein bundling comprises:
 bundling multiple different code packages into a Java Script file.

19. A hosted computing system service, comprising:
 at least one processor;
 a usage correlation generator, implemented by the at least one processor, that accesses usage data indicative of usage of multiple different information packages, of a hosted application, by a user in a session in which the user interacts with the hosted application and that generates a correlation between different subsets of information packages, in the multiple different information packages, based on the usage data;
 a bundle generator, implemented by the at least one processor, that bundles the multiple different information packages into bundles of information packages based on the correlation;
 a bundle trigger detector, implemented by the at least one processor, that detects a bundling trigger wherein the usage correlation generator repeats the steps of accessing usage data and generating a dynamic correlation, and wherein the bundle generator repeats the step of bundling, based on detection of the bundling trigger;
 a bundle loading system configured to receive a request for a requested information package from a client computing system;
 a bundle identifier configured to identify a bundle of information packages that include the requested information package; and
 loading functionality configured to download the identified bundle of information packages to the client computing system.

\* \* \* \* \*